Figure 2:
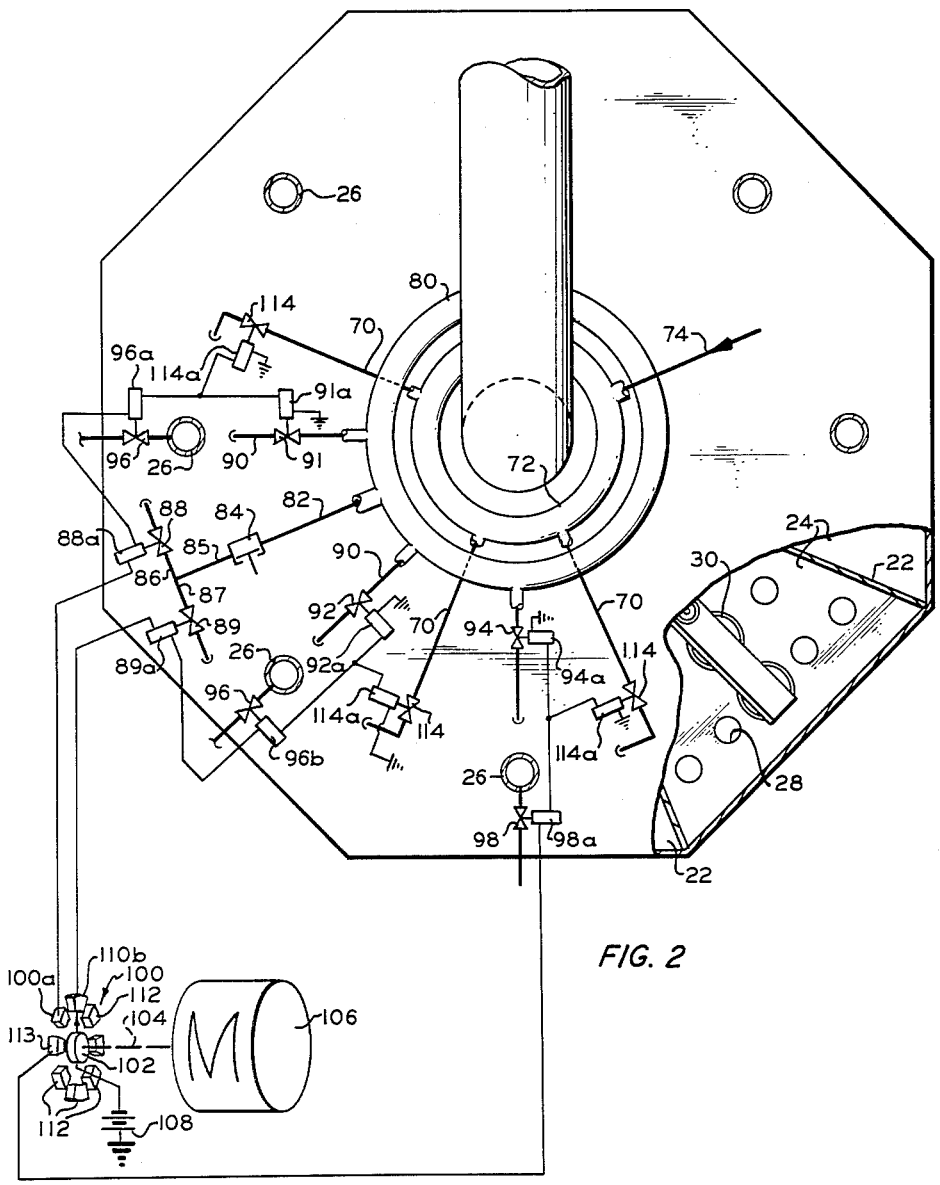

April 5, 1966        H. A. LARSON        3,243,940
BAG FILTERING PROCESS AND APPARATUS
Filed Oct. 13, 1961        2 Sheets-Sheet 1
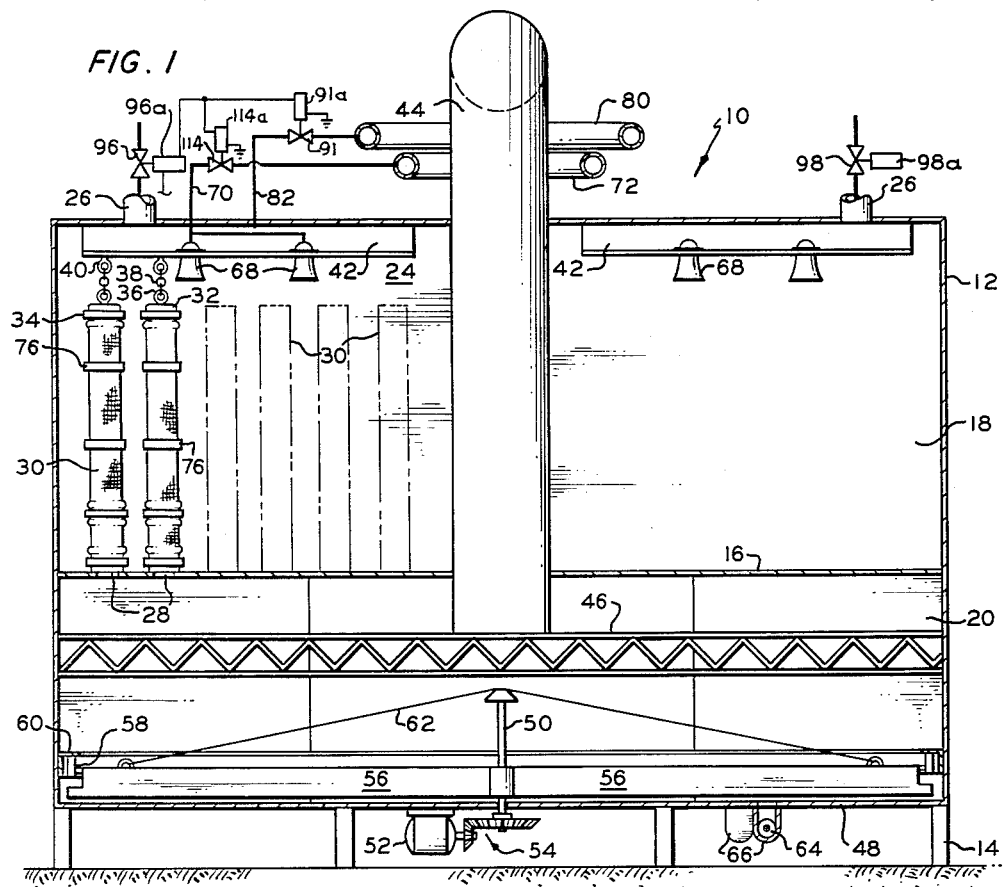
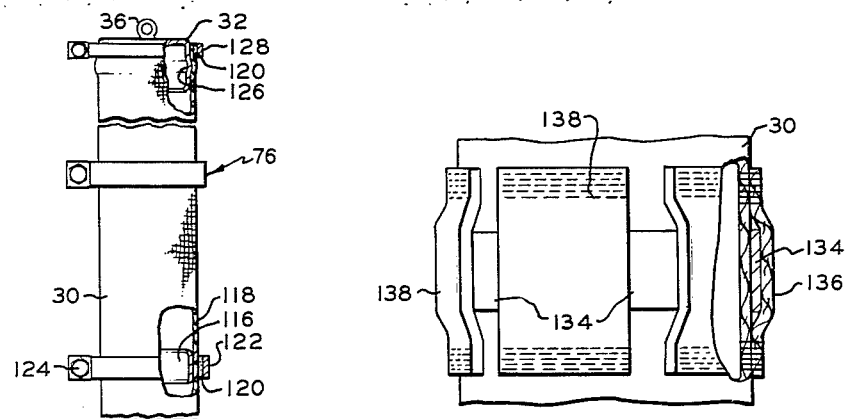
*INVENTOR*
H.A. LARSON
BY *Young & Quigg*
*ATTORNEYS*

INVENTOR
H.A. LARSON
BY Young & Quigg
ATTORNEYS

United States Patent Office 3,243,940
Patented Apr. 5, 1966

3,243,940
BAG FILTERING PROCESS AND APPARATUS
Harold A. Larson, Bartlesville, Okla., assignor to Phillips Petroleum Company, a corporation of Delaware
Filed Oct. 13, 1961, Ser. No. 144,911
12 Claims. (Cl. 55—96)

This invention relates to an improved process and apparatus for filtering solids from a gas-solids stream, such as a stream of smoke from a carbon black furnace.

In many industries there exists the problem of removing suspending solids from a stream of gas which is to be vented to the atmosphere. In some instances it is desirable, from an economical standpoint, to recover the solids. In other instances it is desirable, particularly in congested populated areas, to remove the solids from the vented gases to avoid pollution of the atmosphere. Various designs of different types of filtering equipment have been developed and are in use at the present time. One type of filtering apparatus used is that commonly called the "bag filter." The instant invention relates to such a bag filter and will be described and illustrated as applied to the separation of carbon black particles from the hot effluent gas suspension coming from a carbon black furnace. However, it is to be understood that the instant invention is not to be unduly limited to such application since it can be employed in any system where it is desirous to remove heavier-than-air solids from a gas.

Until recently, bag filtering units were provided with filter bags of about 5" dia. and about 10' in length. One of these bags contained about 14 square feet of filtering surface. A number of carbon black manufacturers shifted to larger bags of 11½" dia. and 25 feet in length which was calculated to reduce the bag replacement cost about 50%. However, all plants using the larger diameter bags had considerable difficulty in their filter operations with the large diameter bags. The problem encountered was chiefly the ripping of bags at the vertical seam, usually along the top three or four feet of the bag. A study was made of the cause of this problem and a solution thereof. The bags in use and under study were fabricated of fiberglass but the same problems and the solution of the invention apply to bags fabricated of other materials.

In a study made of filtering with 5" bags, it was found that 50% better filtering was obtained by "popping" the bags at the end of the backpressuring step. By opening the stack damper of a filtering compartment rapidly so that it moved from a completely closed to a completely open position at the end of the backpressuring step or period in the filtering cycle, audible popping of the bags occurred. This was due to the more rapid change of ΔP across the bag at the change from backpressuring to filtering. During the backpressuring the bags are substantially deflated and at least partially collapsed so that upon rapidly increasing the pressure within the bag so that it is greater than the pressure on the outside of the bag, the bag pops into inflated condition rather violently so as to cause audible popping. In the test in which the damper was opened over a period of two seconds the pop was heard within 1½ seconds of the starting of the opening of the valve. The valve was also opened slowly, utilizing a period of 13 seconds to completely open same and there was no audible popping. The bags were observed and found to inflate 6 seconds after the beginning of the opening of the valve. Without the violent inflation of the bags to cause "popping," the filtering was relatively poor, being 50% better with "popping."

Large bags have a much greater surface area and the same type of seam as that of the smaller diameter bags so that the "popping" technique applied to the larger diameter bags subjects these bags to strain which is greater in proportion to the difference in the surface area of the bags. The seam, being the weakest point in the bag, ruptures first. Hence, it is readily understandable that the larger diameter bags are subjected to ripping at the seam when popped. But, bag popping greatly improves filtering. By operating the stack valve at a sufficiently slow rate to prevent popping the filtering is correspondingly decreased so that the benefit of large diameter bags is more than lost. Obviously, another solution had to be found for the seam ripping problem.

Accordingly, it is an object of the invention to provide an improved process and apparatus for filtering fine suspended solids from a gas carrying same. Another object is to provide a process and apparatus which increase bag life and increase thruput in filtering with porous fabricated bags. A further object is to decrease the strain on porous filter bags so as to increase the life thereof and improve the economy of filtering. It is also an object of the invention to provide an improved process and apparatus for filtering carbon black from the smoke from carbon black reactors. An additional object is to provide an apparatus and process which render carbon black recovery from the smoke from carbon black reactors more efficient and more economical. Other objects of the invention will become apparent to one skilled in the art upon consideration of the complete disclosure.

A solution to the problem has been found which unexpectedly increases thruput capacity of a filter unit utilizing filter bags and also greatly increases the life of the bags used in the unit.

A broad aspect of the invention, apparatuswise, comprises a bag filter unit in which both bag vibrators and supporting rings for holding the bags in substantially inflated condition are positioned. Processwise, a broad aspect of the invention comprises simultaneously holding the filter bags in substantially inflated condition and vibrating the bags during backpressuring thereof (flowing the gas thru the walls into the bags) so as to more efficiently clean the bags for the ensuing filtering phase of the filtering process.

It has been found that large diameter bags substantially completely collapse during backpressuring so that only portions of the bag wall are sufficiently cleaned to permit adequate filtering. Since "popping" of the large diameter bags cannot be tolerated, the bags would therefore return to the inflated position for the filtering step substantially uncleaned. One step in the invention comprises placing supporting rings on the bag to prevent collapsing thereof during backpressuring and this also prevents popping even though the differential across the bag pressure is restored quickly for the filter phase of the cycle. Another step in the invention comprises utilizing vibrators to vibrate the bags during the backpressuring phase of the cycle which more than compensates for the omitted "popping" step. The bags are vibrated by sonic to supersonic horns which effectively rapidly vibrate the walls of the bags. The vibration of the bags during the entire backpressuring step means that the bags are vibrated under two different conditions, viz., when the ΔP reaches 0 and the bag wall is relaxed and when the flow of gas is back into the bag from the backpressuring compartment.

A more complete understanding of the invention may be had by reference to the accompanying schematic drawing of which FIGURE 1 is a view in sectional elevation of a bag filtering apparatus embodying the invention; FIGURE 2 is a top plan view of the apparatus of FIGURE 1; FIGURE 3 is an elevation in partial section of a bag filter element embodying various aspects of the invention; and FIGURE 4 is an elevation of a section of a bag filter in partial section illustrating one type of ring suspending structure.

Referring to FIGURES 1 and 2, a bag filter unit designated 10 comprises a gas tight housing or shell 12 which has a generally octagon shape and is supported by legs 14. The housing 12 is intermediately divided by a horizontal partition or cell plate 16 into an upper filter chamber 18 and a lower solids collection chamber 20. Partitions 22 divide the upper chamber into a plurality of filtering compartments 24. Each filtering compartment is provided at its upper end with a stack 26 for solids-free gas vented from the compartment, and may be equipped with removable closures or manholes (not shown) to permit access for repair and replacement. The filtering compartments 24 are generally triangular in plan and contiguous at two sides with adjacent filtering compartments.

Cell plate 16 is provided with a plurality of apertures 28 communicating with a plurality of elongated bag-type filtering elements 30 which can be made of any suitable fabric, the particular fabric being employed being adapted to the process in which the cell is to be employed. Suitable fabric for this purpose includes that woven from a polyacrylonitrile synthetic fiber available on the open market under the trade-name mark "Orlon." A preferred fabric is that woven from glass fibers. The filter elements 30 are hemmed at their upper ends and are attached to caps 32 by clamps 34. Caps 32 are provided with a ring 36 for hanging the filter element by means of chain or linkage 38 which attaches to a ring 40 provided on the bottom of supporting angle iron 42. Angle irons 42 are welded or otherwise attached to the roof of the housing. Other means of supporting the filter bags from the roof of the housing may be utilized.

Extending down thru the center of housing 12 is an inlet conduit 44 which has its lower end opening into collection chamber 20. The lower end of conduit 44 is supported by means of a truss 46 which extends horizontally across the collection chamber and is suitably secured to the housing 12. The lower end of collection chamber 20 is defined by flat horizontal plate 48. An axial shaft 50 extends upwardly into chamber 20 and is adapted to be rotated by means of motor 52 and gears 54 which are positioned beneath plate 48. A plurality of scraper elements 56 are secured at one end to shaft 50 and radiate outwardly therefrom. Scraper elements 56 are positioned adjacent the upper surface of plate 48 and are provided at their outer extremities with rollers 58 which are adapted to register with a tract 60 secured to the surface of housing 12 in chamber 20. Suitable guy wires 62 are provided to support scraper elements 56. Plate 48 is provided with a plurality of adjoining screw conveyors 64 which are positioned in channels 66 extending from the underside of plate 48. The mechanism just described collects and conveys the solids recovered in chamber 20 to a pick-up conveyor (not shown) for transport to a pelleting operation.

Where the gas suspension to be filtered is hot and moisture-laden such as the hot smoke from a carbon black reactor, it is preferred to provide insulating material around the conduit 44 as well as the walls of the various filtering compartments 24, etc., in order to prevent condensation of moisture within the apparatus. Because of the paragonal shape of the housing, the exposed surface area of the apparatus is relatively small which thus minimizes heat losses. Such a bag filtering apparatus is less expensive to construct because of the flat plate that can be used in contoured sections. However, the invention is also applicable to other bag filter apparatus of different design such as the bag filter of the U.S. patent to Martinez, No. 2,805,732.

Positioned within the upper chamber and preferably suspended from supports 42 are sonic vibrators or horns 68 which are air operated and supplied thru line 70 connected with distributing ring 72 supplied by line 74 from any suitable air source. Other vibrator means may be used in lieu of horns 68.

Bag filters 30 are provided with rings 76 which hold the bags from collapsing from backpressure or sufficiently open to allow gas to flow thru the entire wall of the bag during backpressuring. The number of rings to be utilized in the filter bags depends upon the length of the bags and the manner of operation of the backpressuring step with respect to pressure differential. At least one ring is necessary to provide the benefits of the invention. When only one ring is utilized in each filter bag, it should be positioned in the lower half of the bag, preferably in the lower ⅓ to ⅙ of the bag. In a 25 foot bag of 11½ inches dia., a ring positioned 5 feet from the bottom of the bag has proved very efficient when operating with a pressure differential during backpressuring in the range of about 2 to 5 inches of water.

In FIGURES 1 and 2, backpressure system is shown schematically. An annular backpressuring gas header or ring 80 is mounted above housing 12 and encircles conduit 44. This header is supplied with compressed solids-free gas by line 82 which is connected to a compressor 84. Compressor 84 compresses solids-free gas supplied thereto by lines 85, 86, and 87 and delivers same to ring 80. Lines 86 and 87 are provided with normally open valves 88 and 89, respectively, which are adapted to be actuated by solenoids 88a and 89a, respectively. These lines communicate with different adjacent filtering compartments from which backpressuring gas is supplied. These compartments are hereinafter referred to as backpressuring gas source compartments. Header 80 supplies backpressure gas to each of the filtering compartments 24 via lines 90. Those lines 90 which communicate with the upper portion of those filtering compartments functioning as backpressure gas source compartments are provided with normally closed valves 91 and 92, actuated by solenoids 91a and 92a, respectively. Those lines 90 which communicate with the upper portion of the other filtering compartments are provided with normally closed valves 94, actuated by solenoids 94a.

All of the filtering compartments are provided with stacks 26. The stacks of those filtering compartments which serve as backpressuring gas source compartments are provided with normally open valves 96, FIGURE 1, which valves are actuated by solenoids 96a and 96b. Similarly, those stacks which communicate with the remaining filtering compartments are provided with normally open valves 98 which are actuated by solenoids 98a.

The backpressuring of the individual filtering compartments is synchronized by time clock 100 which comprises a rotatable arm 102 secured to a shaft 104 which in turn is rotated by motor 106. A source of power 108 supplies electrical current to arm 102 and in turn to a plurality of segments 110a, 110b, 112, and 113, when any one of the segments is in contact with the arm 102.

The sonic system comprising horns 68, distributing ring 72, and individual horn lines 70, is supplied air or other operating gas thru line 74. Each line 70 is provided with a normally closed valve 114 operated by solenoid 114a each of which is in the same circuit with the stack valve for its respective compartment so that upon closing of the stack valve, valve 114 is opened to pass air to the horns and remains open until the stack valve is opened, thus operating the horns during the entire backpressuring of the filter compartment.

As shown in FIGURE 2, the following electrical circuits actuate the backpressure system. Solenoids 88a, 96a, 91a, and 114a are connected in series between segment 110a and ground. These latter two sets of solenoids actuate the respective aforementioned valves of the two filtering compartments which serve as backpressuring gas source compartments. Each of the filtering compartments which do not serve as sources of backpressuring gas are provided with a set of solenoids comprising 94a, 98a, and 114a, these valves being connected in series between a segment 112 and ground. Each of the latter sets of solenoids actuate valves 94, 98, and 114. Alternatively, the aforementioned sets of solenoids could be connected in parallel.

In operation, gas containing suspended solids, for example, the smoke from a carbon black furnace, is centrally introduced into the upper portion of the solids collection chamber 20 by conduit 44. The thus introduced smoke flows radially outwardly in chamber 20 and thence upwardly thru apertures 28 into the bags of the filtering compartments. The gas passes thru the filter bags, dropping a portion of the solids into chamber 20 and leaving a portion on the inside walls of the bags. The solids-free gas passing thru the mesh of the bags flows thru the outlet stack 26 of each compartment, the valves in the stacks being normally open. As the filtering continues in a given filtering compartment for a period of about 160 seconds, the stack damper is closed and the backpressuring gas valve for that compartment is opened so as to cause gas to flow back into the filter bags and the horns in that compartment are operating to vibrate the bags during the backflow therethru to dislodge particles from the bag wall.

The operating sequence of the filter is controlled by time clock 100. When the arm 102 of the clock comes into contact with a segment such as a segment 112, the solenoids 94a, 98a, and 114a are energized whereby the normally open valve 98 in the outlet stack 26 is closed and normally closed valves 94 and 114 are opened so as to introduce backpressuring gas and air to the air horns in the compartment being backpressured. The backpressuring gas passes walls of the filtering bags and the horns vibrate so as to vibrate the bags, thereby dislodging the deposited solids adhering to the sides of the bags. The rings 76 effectively hold the bags in the open position and prevent their collapse so that repressuring gas can freely flow thru all sections of the bag. The dislodged solids fall thru apertures 28 into the bottom or collection chamber 20 from which they are recovered by the recovery equipment therein.

Since the valves 88 and 89 in the backpressure gas source lines 86 and 87 are normally open when filtering compartments other than those filter compartments to which lines 86 and 87 lead, these valves 88 and 89 are closed when their respective solenoids 88a and 89a are energized upon contact of arm 102 with corresponding segment 110a or segment 110b. When one of the backpressuring gas source compartments is to be backpressured according to sequence, the valve serving this compartment, 88 or 89 is closed, as well as the valve 96 in the outlet stack of that compartment. At the same time the valve 91 or 92 supplying backpressuring gas to that compartment is opened along with the valve 114 in the air line to the horn system. During the backpressuring of one of these two compartments, backpressuring gas is supplied from the other gas source compartment.

FIGURE 3 shows a ring 116 inside of the wall 118 of bag 30 and of substantially the same diameter as the bag. A ring of asbestos tape 120 is attached to the outer wall of the bag around ring 116 and a metal clamp 122 substantially in the form of a radiator hose clamp, provided with clamping means 124, firmly holds ring 116 in the desired location in the bag. The upper end of the bag is closed by cap 32 which is provided with an expanded portion 126 over which the bag is extended and clamped into place by ring 128. A ring of asbestos tape 120 may be utilized under ring 128 or the upper end of the bag may be hemmed to provide protection from the ring.

The structure shown for the lower ring comprises a ring 130 which has a pair of expanded sections 126 as in cap 32 and the bag 30 is made in separate sections each of which extends onto the ring from opposite sides and is clamped in place by a clamp 122 over tape 120.

The bottom end of the bag is attached to an upright flange 132 extending from partition 16 and located around aperture 28 in the partition. Here, again, an expanded section 126 is provided to help secure the bag and the lower end of the bag may be hemmed and secured by clamp 122 with or without tape.

In FIGURE 4, ring 134 is positioned around bag 30 and is held in place by tunnel loop, 136 which may extend entirely around the bag or it may be made in sections 138. Loop or loops 138 may be attached by stitching to bag 30 along the upper and lower margins of the loop. Other suitable means of attaching this loop or loops may be utilized such as rivets or suitable adhesives.

Tests were run with a bag filter unit comprising 9 compartments each containing 112 filter bags with the effluent from 3 or more reactors on "smoke" passing into the unit. The bags were 25 feet long and of 11½ inch diameter. Rings, when used, were placed 5 feet from the lower end of the bags.

The time cycle for operation of a filter compartment covers a period of 3 minutes or 180 seconds, 160 of which are consumed in filtering (valve in stack open and valve in backpressuring conduit closed). When the valves are reversed at the end of the filtering phase of the cycle, about one second is consumed in equalizing the pressure in the two chambers (opposite sides of bags) or bringing ΔP across the bags to 0. When ΔP across the bags is 0, the bags tend to collapse and complete collapse is prevented by the rings. This condition prevails for about 11 seconds. Then pressure on the outside of the bags builds up for about 1 second to a maximum and holds at this maximum for about 8 seconds at which time the valves are reversed and the pressure on the outside of the bags is again reduced over a period of a few seconds to resume filtering.

During the cleaning cycle of one compartment there are 8 other compartments operating so that gas is passing thru 8 of the compartments to stack at all times. The vibration device (horn) is operated continuously for the 20 second period while the stack valve is closed and the backpressuring valve is open.

The filtering process was operated without either horns or rings, without horns and with rings, and without rings and with horns, as well as with both rings and horns in the filtering compartment. The ΔP across the bags and ΔP across the stack was sensed during the runs. Using no rings and no horns and 3 reactors, the ΔP across the bags was 8.0 and ΔP across the stack was 0.5 or a total ΔP of 8.5 (all pressures measured in inches of water). With horns and rings both operating and with more than 3 reactors passing "smoke" to the filter unit, the ΔP across the bags was only 2.8 while the ΔP across the stack was 2.9 or a total ΔP of 5.7. This decrease in ΔP across the bags and increase in ΔP across the stack is significant. Since the stack is a fixed orifice this rise in ΔP across the stack from 0.5 to 2.9 indicates a substantial increase in volume of gas passing thrus the filter compartment or flow rate thru the stack, yet the ΔP across the bags dropped tremendously (from 8.0 to 2.8).

Using horns but no rings, the ΔP across the bags was 2.4 and the ΔP across the stack was 0.6 or a total ΔP of 3.0.

Using rings but no horns, the ΔP across the bags was 4.2 and the ΔP across the stack was 1.3 or a total ΔP of 5.5.

From the data it is calculated that 2.4 times as much filtering is effected with the filter constructed with horns and rings as with the filter without horns and rings and the increased filtering is done at a substantially lower ΔP across the bags.

The maximum number of reactors that can be handled by the filtering unit when using horns only, rings only, and both horns and rings can also be calculated from the data obtained. When using horns only, the maximum number of reactors which can be operated with the filter unit is found by the formula $$\sqrt{\tfrac{0.6}{0.5}} \times 3 \times \sqrt{\tfrac{8.0}{2.4}} = 6.0$$

This is 3 additional reactors compared with operation without horns or rings. It is assumed that the maximum allowable pressure drop across the bags is 8.0.

Similarly, the maximum number of reactors to be handled when using only rings is found by the formula $$\sqrt{\tfrac{1.3}{0.5}} \times 3 \times \sqrt{\tfrac{8.0}{5.5}} = 5.8$$

This is 2.8 more reactors than without either horns or rings.

Calculating the maximum numbers of reactors permissible at a ΔP across the bags of 8 and using both horns and rings, the formula $$\sqrt{\tfrac{2.9}{0.9}} \times 3 \times \sqrt{\tfrac{8.0}{2.8}} = 12.2$$

indicates that effective filtering can be done with 12 reactors on the filter. This is an increase of 9 reactors over the capacity of the filter without horns and rings. This is in contrast with the sum of 3 and 2.8 reactors which can be added to the filter unit by these improvements individually. However it could not reasonably be expected that the sum of the improvements of 3 and 2.8 or 5.8 reactors could be obtained by using both the horns and rings. However, the increased benefit of 9 reactors is substantially more than the sum of any possible advantages of the individual improvements.

The use of both horns and rings is essential to most efficient filtering when using large bags. Popping can bt used with small bags, such as those up to about 9 inches to clear the filter area of solids. Larger bags are burst at the seams by this technique and the invention provides a different solution to the problem of cleaning the bags during backpressuring. While large bags thus far have not exceeded 11½ inches in diameter, it is believed that larger diameter bags than this such as up to 2 feet dia. can be used in the process and apparatus of the invention.

ΔP across the bags has been found to be in proportion to square of gas flow through the bags. Carbon black loading has been found to have very litle effect on the ΔP across the bags. To illustrate this point, when operating with 3 reactors on "smoke" with the effluent passing to one bag filter the bag filter operates successfully but when the smoke free effluent of a fourth reactor is also passed to this bag filter, the bag filter is definitely overloaded and cannot adequately do the filtering necessary.

The ΔP across the bag is increased substantially as much as if the fourth effluent contained smoke.

While the disclosure is directed principally to the application of the invention to relatively large diameter bags, it is also applicable to relatively small diameter bags such as those of less than 9 inch diameter, even though such bags may be operated by popping. The technique of simultaneously backpressuring and sonically or supersonically vibrating the smaller bags while holding them in inflated condition by means of rings produces the same outstanding results as when applying the invention to larger bags.

The sonic to supersonic vibration of the bags in accordance with the invention is substantially different than mechanical vibration heretofore applied to filter bags. In the first place, the vibration frequency caused by sonic to supersonic vibration is materially higher and the amplitude of vibration is materially smaller. In the second place, mechanical vibration places a great deal more strain and wear on the bags. Thus the results obtained with sonic vibration are far superior to any results obtained with mechanical vibration. In tests with 5½" bags in a plant installation, mechanical shakers were used and it was found that they reduced the life of the bags to about ½ to ⅔ of normal bag life and they were abandoned.

Certain modifications of the invention will become apparent to those skilled in the art and the illustrative details disclosed are not to be construed as imposing unnecessary limitations on the invention.

I claim:
1. A cyclic process for filtering fine dust-like solids from a gaseous stream containing same which comprises the steps of:
    (1) passing said stream under substantial pressure upwardly into the open bottom end of an upright elongated porous cylindrical walled bag closed at the top and rigidly supported at both ends holding same in longitudinal tension, and passing the gas of said stream outwardly thru the walls of said bag while collecting said solids on the inner surface of said walls for a substantial filtering period;
    (2) at the end of the filtering period of step (1) removing solids from said inner surface by forcing clean gas from step (1) under substantial differential backpressure thru said walls from the outside to the inside of said bag and out thru the bottom thereof for a substantial bag cleaning period, which pressure would normally cause collapse of said bag;
    (3) simultaneously with step (2) preventing collapse of said walls by mechanically holding a plurality of transverse sections of said walls at spaced-apart levels intermediate and spaced substantially from the ends of the bag in expanded cylindrical form;
    (4) simultaneously with steps (2) and (3) increasing the solids removal by vibrating said walls with sonic to supersonic waves while maintaining the ends of said bag fixed;
    (5) at the end of steps (2) and (3), repeating step (1) so as to repressure said bag from the inside and simultaneously preventing bag popping which normally will occur absent step (3); and
    (6) repeating the foregoing steps.

2. The process of claim 1 wherein said bags are approximately 25 feet long and 11½ inches in diameter and said stream is a suspension of carbon black.

3. The process of claim 1 wherein the backpressure differential is in the range of about 2 to 5 inches of water.

4. The process of claim 1 wherein said particulate solids comprise carbon black.

5. The process of claim 1 wherein the wall of said bag is vibrated with sonic waves.

6. The process of claim 5 wherein said particulate solids comprise carbon black.

7. A filtering device comprising in combination:
    (a) a filter housing;
    (b) an elongated upright inverted porous bag closed at the top and suspended in said housing, being rigidly supported at its ends and unsupported intermediate its ends;
    (c) a generally horizontal partition having an aperture therein and extending across said housing, the lower open end of said bag sealed around said aperture to fix said lower end and form gas-tight upper and lower compartments above and below said partition so that the pores of said bag provide the only gas passageway therebetween;
    (d) a vent stack for clean off-gas and a backpressuring gas inlet in said upper compartment;
    (e) means for injecting clean off-gas backpressuring gas into said inlet;
    (f) a feed gas inlet and a separate solids outlet in said lower compartment;
    (g) a plurality of rings in contact with the wall of said bag coaxial therewith of substantially the same diameter as said bag spaced apart along the length thereof and holding said wall in expanded form adjacent said rings for preventing collapse of said bag at and between said rings when pressure in said upper compartment is higher than pressure in said lower compartment during backpressuring of said bag with gas injected thru said backpressuring gas inlet and preventing popping of said bag when repressuring within said bag is resumed; and (h) means within said housing for vibrating said bag with sonic to supersonic waves.

8. The device of claim 7 wherein said means for vibrating said bag comprises a sonic horn positioned within said housing and directed toward said bag.

9. The device of claim 7 wherein said rings are inside of said bag and are secured thereto by clamping means holding said bag in contact with said rings.

10. The method for removing particulate solids from the inside walls of an elongated upright inverted filter bag, closed at the top and fixed at both ends holding same in longitudinal tension, deposited thereon by flowing a gas-solids stream upwardly into said bag, filtering said gas, and passing solids-free gas thru the walls thereof, which comprises simultaneously vibrating the walls of said bag with sonic to supersonic waves and forcing solids-free gas from the filtering step as backpressuring gas thru said walls into said bag at normally collapsing pressure; mechanically maintaining a transverse section of said walls in expanded circular form against substantial inward radial movement at at least one level spaced substantially from the top and bottom of the bag so as to prevent collapse of said bag to allow gas to pass thru substantially the entire area of said walls, thereby causing said particulate solids to fall off said walls; terminating backpressuring and immediately repressuring said bag with said gas-solids stream so that the preventing of said collapse avoids bag popping with attendant deterioration of said bag.

11. Filtering apparatus for filtering carbon black from a gas stream containing same comprising in combination an air-tight housing divided into an upper chamber and a lower chamber by partition means, said upper chamber being subdivided into a plurality of filtering compartments; a plurality of elongated upright inverted filtering bags closed at the top in each of said compartments rigidly supported at both ends and unsupported intermediate their ends to hold same in longitudinal tension, the open lower ends of said bags being in sealed communication with said lower chamber; means for holding each of said bags open during backpressuring and for preventing popping thereof upon termination of backpressuring and repressuring with said stream; actuatable wave vibrating means in each of said compartments for vibrating the walls of said bags to help free same of solids; inlet means in said lower chamber for said stream; a solids outlet from said lower chamber; an outlet stack for clean off-gas from each of said compartments having a normally open valve therein; first conduit means having a normally closed valve therein and communicating with each of said compartments and with one of said stacks as a source of backpressuring gas for periodically back pressuring said compartments to help remove solids from the walls of said bags; means for simultaneously closing said normally open valves, opening said normally closed valves, and actuating said vibrating means in each compartment successively on a predetermined time cycle so as to simultaneously force gas back thru said bags and vibrate same while holding same in open condition.

12. Filtering apparatus comprising in combination an air-tight housing divided into an upper chamber and a lower chamber by partition means, said supper chamber being subdivided into a plurality of filtering compartments; a plurality of elongated upright inverted filtering bags of at least 9 inch diameter and closed at the top in each of said compartments, rigidly supported at both ends to hold said bags in longitudinal tension, the open lower ends of said bags being in sealed communication with said lower chamber; a plurality of rings holding each said bag open, said rings being positioned intermediate the ends of said bag spaced therefrom and in spaced-apart relation; sonic to supersonic wave bag vibrating means in each said filtering compartment; inlet means in said lower chamber for a gas-solids stream; a solids outlet from said lower chamber; an outlet stack for removing solids-free gas from each of said compartments having a normally open valve therein; first conduit means for periodically reintroducing a portion of said solids-free gas into each of said compartments under pressure to dislodge solids from the walls of the bags therein so that solids fall into said lower chamber, said first conduit means having a normally closed valve therein; second conduit means communicating with at least two of said filtering compartments and with a compressor and a backpressuring gas header, each of said second conduit means having a valve therein, said first conduit means communicating with said header; means for periodically actuating said valves associated with each of said filtering compartments and simultaneously actuating said vibrating means in a time cycle whereby said filtering compartments are successively backpressured with said solids-free gas and said bags are vibrated while being held open by said rings during backpressuring.

References Cited by the Examiner
UNITED STATES PATENTS

| | | | |
|---|---|---|---|
| 1,336,600 | 4/1920 | Tuttle | 55—291 |
| 1,843,639 | 2/1932 | Hansen | 55—381 X |
| 1,855,672 | 4/1932 | Gudka | 55—275 |
| 1,915,408 | 6/1933 | Crossen | 55—292 |
| 2,094,775 | 10/1937 | Bedford | 55—341 XR |
| 2,350,011 | 5/1944 | Black | 55—96 |
| 2,769,506 | 11/1956 | Abboud | 55—292 |
| 2,871,978 | 2/1959 | Webster et al. | 55—273 |
| 2,962,120 | 11/1960 | Lagarias | 55—292 |
| 2,976,953 | 3/1961 | Hass et al. | 55—279 XR |
| 3,053,031 | 9/1962 | Vedder et al. | 55—292 |
| 3,078,646 | 2/1963 | Leech et al. | 55—293 |
| 3,092,479 | 6/1963 | Hedberg | 55—341 |
| 3,097,410 | 7/1963 | Lincoln | 55—292 |
| 3,097,936 | 7/1963 | Lincoln | 55—292 |
| 3,118,748 | 1/1964 | Delfs | 55—292 |
| 3,158,455 | 11/1964 | Lincoln | 55—292 |

FOREIGN PATENTS

| | | |
|---|---|---|
| 1,260,394 | 3/1961 | France. |
| 867,576 | 5/1961 | Great Britain. |

HARRY B. THORNTON, *Primary Examiner.*

REUBEN FRIEDMAN, HERBERT L. MARTIN
*Examiners.*